Patented June 12, 1951

2,556,799

UNITED STATES PATENT OFFICE 2,556,799

HETEROPOLYMERIZATION OF SULFUR DIOXIDE AND AN UNSATURATED ORGANIC COMPOUND IN THE PRESENCE OF AN IRON POLYPHOSPHATE

Willie W. Crouch and John F. Howe, Bartlesville, Okla., assignors to Phillips Petroleum Company, a corporation of Delaware No Drawing. Application April 28, 1949, Serial No. 90,274

15 Claims. (Cl. 260—79.3)

This invention relates to the production of synthetic resinous materials formed by reaction between sulfur dioxide and one or more unsaturated organic compounds.

One of the primary features of this invention is the use of an iron polyphosphate, or a mixture of an iron salt and a polyphosphate, as a catalyst in such a reaction.

It has been well known for a number of years that sulfur dioxide will react with numerous unsaturated organic materials to form heteropolymeric resinous products. Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascariodole, ozonized olefins, etc. Organic compounds which enter into the formation of such resins include mono-olefins, cycloolefins, substituted aliphatic olefins such as styrene, diolefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

There are two main methods of effecting such polymerizations—one in a homogenous mass comprising the two reactants, with or without a solvent for the reactants, and one with the reactants dispersed in an aqueous emulsion. In a polymerization in a homogeneous mass, it is usually preferable to employ a large excess of sulfur dioxide, such as up to 10 to 30 times the amount equivalent to the unsaturated organic compound. The excess liquid sulfur dioxide is an excellent solvent for the resulting resin, the reaction mixture is quite fluid, and no extraneous materials are present to contaminate the resin. Polymerization in aqueous emulsion has the advantage that much less sulfur dioxide can be used, and the resulting resin is readily obtained in a finely divided form. We have now discovered that complex ferric polyphosphates are catalysts of great activity for the heteropolymerization of sulfur dioxide with organic unsaturated materials. Examples of the catalysts which can be used in the practice of our invention are ferric pyrophosphate, ferric tetraphosphate, ferric triopolyphosphate and ferric hexametaphosphate. When emulsion polymerization is carried out, these catalysts need not be added as such but may be introduced as salts of the two ions, e. g., adding ferric sulfate and tetrasodium pyrophosphate separately to the aqueous emulsion is equally as effective as ferric pyrophosphate itself.

An object of this invention is to react sulfur dioxide and an unsaturated organic compound to form a heteropolymeric resin.

Another object of this invention is to provide effective and efficient catalysts for the production of resinous materials by the interreaction of an unsaturated organic compound and sulfur dioxide.

A further object of this invention is to produce olefin-sulfur dioxide resins.

Still another object of our invention is to produce olefin-sulfur dioxide resins efficiently when a reaction retarding material is present in the reacting mixture.

Further objects and advantages of our invention will become apparent, to one skilled in the art, from the accompanying disclosure and discussion.

In the production of resins from sulfur dioxide and unsaturated organic compounds it is important to use catalysts which will act to promote rapid reaction and which, at the same time, will not be so active chemically as to have undesirable secondary influences on the reaction system, the product, or the reactants. One of the peculiar characteristics about the production of resins from sulfur dioxide and unsaturated organic compounds is the "ceiling temperature" effect, first discovered in connection with the reaction in a homogeneous mixture but present also in polymerization in aqueous emulsion. For various unsaturated reactants there is a temperature, or ceiling, above which they apparently will not take part in the resin-forming reaction, and will actually retard or inhibit the reaction when present in minor amounts in admixture with other unsaturates which will react at those temperatures. As an illustration, the ceiling temperature for reaction of sulfur dioxide with 2-butene in homogeneous reaction is 109–113° F. (Snow and Frey, J. Am. Chem. Soc., vol. 65, 2417 (1943)), and when reacting these materials in aqueous emulsion the following temperature effects are observed.

*Reaction recipe*

| | Parts by weight |
|---|---|
| Olefin | 46.7 |
| $SO_2$ | 88.3 |
| Emulsifier | 5.0 |
| Lithium nitrate | 0.5 |
| Water | 180.0 |

*Temperature effect, 2-butene*

| Temp., °F. | Time, Hours | Yield, Per Cent | Appearance of Mixture |
|---|---|---|---|
| 77 | 5 | 46.6 | Good Latex. |
| 77 | 24 | 63.4 | Some Precoagulation. |
| 86 | 5 | 17.2 | Good Latex. |
| 86 | 9 | 24.0 | Total Precoagulation. |
| 86 | 24 | 21.9 | Do. |
| 95 | 23 | 1.2 | No Latex—Two Layers. |

In ordinary production of a butene, it is usually difficult and expensive to produce any one butene in a pure form free from one or more other butenes. As one typical example, a plant stream rich in 1-butene has the following composition, in per cent by weight.

| | Percent |
|---|---|
| $C_3$ | 22.9 |
| Isobutane | 5.9 |
| Isobutylene | 0.8 |
| 1-butene | 46.5 |
| Butadiene-1,3 | 17.4 |
| Normal butane | 6.2 |
| 2-butenes | 0.3 |
| | 100.0 |

Isobutylene has a ceiling temperature of about 39–41° F. In a series of tests made with the foregoing recipe, in which the olefin was 1-butene contaminated with various amounts of isobutylene, the following results were obtained at a reaction temperature of 77° F. and a reaction time of 5 hours.

| Per Cent Isobutylene In Olefin Charge | Per Cent Yield |
|---|---|
| 0.69 | 96.9 |
| 1.12 | 97.3 |
| 1.81 | 95.7 |
| 2.30 | 81.0 |
| 2.72 | 85.4 |
| 3.75 | 61.3 |
| 4.8 | 23.5 |
| 10.0 | 11.1 |
| 15.0 | 8.0 |

With this catalyst, under these conditions, the presence of more than about 2 per cent isobutylene markedly retards the reaction, and only 5 per cent isobutylene almost stops the reaction.

We have found that not only is a ferric polyphosphate a very active catalyst for the resin-forming reaction, but that one of the great advantages accruing from its use is that the retarding effect of an olefin impurity, which is a retardant at the reaction temperature, is markedly reduced. As previously stated, and as will be illustrated, these catalysts may be added as specific compounds, or a ferric salt and a polyphosphate may be added, to the reaction mixture, either together or separately. When using the latter procedure, it is preferred that the ferric salt be a nitrate, sulfate, chloride, citrate, or the like, and the polyphosphate be a salt of an alkali metal or ammonium, preferably a salt of sodium or potassium. The amount of catalyst, calculated as ferric polyphosphate, should usually be within the range of 0.1 to 2 per cent by weight of the theoretical proportions of sulfur dioxide and unsaturated organic compound charged to the reaction. Amounts of catalyst in the range of 0.2 to 0.8 per cent by weight are generally preferred.

Unsaturated organic compounds which are applicable in this invention are those which will react with sulfur dioxide to produce heteropolymeric compounds, under the other conditions heretofore employed by the prior art. Most of such reactants contain an olefinic linkage, and may be represented by the formula

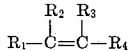

$$R_1-\underset{\underset{R_2}{|}}{C}=\underset{\underset{R_3}{|}}{C}-R_4$$

wherein $R_1$ and $R_2$ may be hydrogen, halogen, or alkyl, or $R_1$ may be a constituent of a carbocyclic ring in which $R_4$ is a member, and $R_3$ and $R_4$ may be hydrogen, alkyl, alkenyl, aryl, aralkyl, or have an acetylenic linkage, or substituted groups thereof wherein substituents such as halo, nitro, hydroxyl, carbocyclic, cyano, and the like may be present, or $R_4$ may be a constituent of a carbocyclic ring in which $R_1$ is also a member. In general the olefinic compound employed will not contain more than twenty carbon atoms per molecule. Examples of olefinic compounds which may be used include 1-butene, 2-butene, propylene, isobutylene, pentenes, hexenes, cyclohexene, butadiene, styrene, alpha-methylstyrene, alpha-chloro styrene, vinylacetylenes, vinyl chlorides, vinyl bromide, and the like. It is also frequently desired to employ a mixture of olefinic compounds, rather than a single olefinic compound, in carrying out the process of this invention.

When operating according to the manner herein described it is generally found that substantially equimolar proportions of olefinic compound and sulfur dioxide react together. However, it is sometimes desired to use a molar excess of sulfur dioxide, say a 2:1 mol ratio of sulfur dioxide to olefinic material. In some cases it may even be desirable to use a higher ratio of the one reactant to the other, for example, a ratio of 5:1, or greater, depending upon operating conditions, olefinic material employed, amount of aqueous medium, etc., although it appears that, even in such cases, equimolar quantities of sulfur dioxide and olefinic compound enter into reaction. Frequently it will be desirable to remove the reactants from the reaction zone, and separate unreacted materials, when between about 70 and about 97 per cent of the reactant present in the lesser amount has reacted. When some diolefins are used as reactants, under some conditions, these materials tend to undergo homopolymerization to form rubber-like products; such reactions are undesired in our invention and conditions should be chosen with such diolefinic reactants, to inhibit such homopolymerization and favor joint interreaction to produce heteropolymeric resins.

In one general embodiment, the process of the present invention comprises the preparation of an aqueous emulsion of a monoolefin with sulfur dioxide in the presence of a suitable emulsifying agent. The emulsified reactants are agitated at a reaction temperature for a period necessary to effect the desired conversion, after which the latex may be subjected to a stripping operation to remove unreacted olefin and sulfur dioxide together with any other volatile impurities. Separation of the resin is effected by coagulation of the latex, such as with brine-alcohol, brine-acid, solutions of electrolytes, etc., followed by water washing, filtration, and drying of the product. The resinous material thus obtained is a light, soft, fine white powder, its solubility in various solvents depending upon the olefinic material employed. For example, when 1-butene is used, the product is completely soluble in acetone.

Emulsifying agents which are applicable are those which are active in an aqueous medium which has a pH below 7. The aqueous medium in the emulsion used generally has a pH of about 1 to 2, and sometimes has a pH as low as about 0.5. The emulsifying agent used should, of course, be effective at the pH of the aqueous medium in the reaction mixture. Among the compounds which have been found effective are the long chain alkyl sodium sulfates and the branched chain aliphatic or aromatic sodium sulfonates, salts of organic bases such as amine salts, and quaternary ammonium salts. Examples of these materials are lauryl sodium sulfate, diamyl sodium sulfosuccinate, di-secondary-butyl naphthalene sodium sulfonate, dodecylamine hydrochloride, dodecylamine sulfate, and the like. The amount of emulsifying agent employed is that quantity which is necessary to produce a stable emulsion of the ingredients. In some cases an amount as low as about 1 part per 100 parts reactants (olefin plus sulfur dioxide) is considered sufficient and usually an amount not to exceed about 10 parts is added.

Temperatures for carrying out the resin-producing reactions of this invention will usually fall within the range of about 10 to about 140° F., with the narrower range 50 to 120° F. being most frequently preferred. However, in some instances it may be considered advisable to employ temperatures below 10° F. in order to get a more satisfactory reaction.

Obviously when polymerizations are carried out in aqueous emulsion in the absence of freezing point depressants, temperatures below the freezing point of the acidic aqueous medium cannot be employed. The use of various additive agents, however, makes a process of the type disclosed herein applicable at lower temperatures. An example of such a low temperature system is a glycerin-water solution, and the term "aqueous emulsion" should be construed to include the use of an aqueous medium comprising water and a sufficient amount of a water-soluble component to lower the freezing point below the desired polymerization temperature, whether or not the actual polymerization temperature is above or below freezing. It is generally preferred that the emulsion be of an "oil in water" type, with the ratio of aqueous medium to organic monomeric material between about 1.5:1 and about 10:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Advantages of this invention are illustrated by the following examples. The reactants, and their proportions, and the other specific ingredients of the recipes are presented as being typical and should not be construed to limit the invention unduly.

*Example 1*

A polymerization was effected in aqueous emulsion employing the following recipe:

| | Parts by weight |
|---|---|
| 1-butene | 46.7 |
| Sulfur dioxide | 88.3 |
| Sodium di-sec-butyl naphthalene sulfonate | 5.0 |
| Water | 180.0 |
| Ferric pyrophosphate | 0.5 |

The mixture was agitated for 1.5 hours at 77° F. At the end of this period there was recovered a fluid latex which was coagulated by addition to methanol and the resulting polymer recovered, dried and weighed. A yield of 90.7 per cent of theoretical, based on the charge of 1-butene, was obtained.

*Example 2*

A series of polymerizations were carried out using the same recipe as in Example 1 except that the catalysts were those shown in the table below and the 1-butene was a commercial product containing four per cent isobutylene, a powerful retarder for the reaction of 1-butene with sulfur dioxide, at ordinary temperatures of polymerization. All the polymerizations were carried out at 77° F. during a period of five hours. In cases where the catalyst was added in the form of two salts 0.2 part of each salt were added. Where only one salt was employed 0.4 part was added. The conversions are based on olefins charged.

| Catalyst | Per Cent Conversion |
|---|---|
| Ferric pyrophosphate | 90.1 |
| Soluble ferric pyrophosphate [1] | 90.3 |
| Tetrasodium pyrophosphate decahydrate and ferric sulfate hexahydrate | 93.8 |
| Tetrasodium pyrophosphate decahydrate and ferric nitrate nonahydrate | 92.1 |
| Tetrasodium pyrophosphate decahydrate and ferric ammonium sulfate | 88.8 |
| Tetrasodium pyrophosphate and ferric ammonium citrate | 92.2 |
| Sodium tripolyphosphate and ferric sulfate hexahydrate | 54.5 |
| Sodium hexametaphosphate and ferric sulfate hexahydrate | 42.4 |
| Sodium tetraphosphate and ferric sulfate hexahydrate | 64.7 |
| Ammonium nitrate | 30.7 |
| Soluble ferric phosphate | 0 |
| Ferric nitrate | 8.4 |
| Ferric ammonium sulfate (24 hours) | 1.5 |
| Sodium pyrophosphate | 0 |
| Sodium hexametaphosphate | 0 |
| Sodium tetraphosphate | 0 |

Ammonium nitrate, one of the commonly employed catalysts in the prior art, is included for comparison.

[1] A complex salt of sodium ferricitropyrophosphate, available commercially as a proprietary product.

Example 3

Another series of polymerizations was carried out in exactly the same manner as in Example 1 except that the reaction was allowed to proceed only 2.5 hours and the amounts of the salts comprising the catalysts were as noted below:

| Catalyst, Parts by Weight | | Per Cent Conversion |
|---|---|---|
| Sodium Pyrophosphate Decahydrate | Ferric Sulfate Hexahydrate | |
| 0.15 | 0.15 | 34.4 |
| 0.30 | 0.30 | 73.0 |
| 0.50 | 0.50 | 70.0 |
| 0.20 | 0.10 | 22.8 |
| 0.40 | 0.20 | 50.2 |
| 0.60 | 0.30 | 65.9 |

Example 4

A polymerization was effected in aqueous emulsion employing the following recipe:

| | Parts by weight |
|---|---|
| 2-butene | 46.7 |
| Sulfur dioxide | 88.3 |
| Sodium di-sec-butyl naphthalene sulfonate | 5.0 |
| Water | 180.0 |
| Catalyst: tetrasodium pyrophosphate decahydrate | 0.30 |
| ferric sulfate hexahydrate | 0.15 |

The polymerization was allowed to continue for 24 hours at 77° F. The percent conversion was 36.2, based on 2-butene.

Example 5

A polymerization was effected in aqueous emulsion employing the following recipe:

| | Parts by weight |
|---|---|
| 1-octene | 63.6 |
| Sulfur dioxide | 71.4 |
| Sodium di-sec-butyl naphthalene sulfonate | 5.0 |
| Water | 180.0 |
| Catalyst: tetrasodium pyrophosphate decahydrate | 0.30 |
| ferric sulfate hexahydrate | 0.15 |

The polymerization was allowed to continue for 3.5 hours at 77° F. The per cent conversion was 78.2, based on 1-octene.

Example 6

A series of polymerizations was effected in emulsion employing the following recipe:

| | Parts by weight |
|---|---|
| Olefin | 46.7 |
| Sulfur dioxide | 88.3 |
| Sodium di-sec-butyl naphthalene sulfonate | 5.0 |
| Water | 180.0 |
| Catalyst: tetrasodium pyrophosphate decahydrate | 0.3 |
| ferric sulfate hexahydrate | 0.15 |

1-butene contaminated with various amounts of iso-butylene comprised the olefin in all cases. All the polymerizations were carried out for 2.5 hours at a temperature of 77° F. The table below shows the composition of the olefin in each polymerization together with the per cent conversion.

These data demonstrate the powerful inhibiting effect of isobutylene.

| Olefin | | Per Cent Conversion |
|---|---|---|
| Weight Per Cent Isobutylene | Weight Per Cent 1-Butene | |
| 20 | 80 | 2.6 |
| 10 | 90 | 12.0 |
| 5 | 95 | 31.2 |
| 3 | 97 | 63.4 |
| 2 | 98 | 84.7 |

Example 7

A run was made using a complex salt of sodium ferricitro-pyrophosphate as a catalyst to promote the reaction with the reactants in a homogeneous, or bulk, reaction mixture. With 0.12 part of this catalyst added to a mixture of 12 parts 2-butene and 180 parts (all by weight) of sulfur dioxide, a yield of 4.3 per cent resin was obtained in 20 hours at a reaction temperature of 77° F. In another run in which the same amount of 1-butene was used in place of the 2-butene, a somewhat smaller yield was obtained in the same length of time.

As will be evident to those skilled in the art, various modifications of this invention can be made, or followed in the light of the foregoing disclosure and discussion, without departing from the spirit or scope of the disclosure or from the scope of the claims.

We claim:

1. A process for producing a heteropolymeric resin of a butene and sulfur dioxide, which comprises reacting a butene with sulfur dioxide while dispersed in an aqueous emulsion in the presence of ferric pyrophosphate.

2. The process of claim 1 in which said ferric pyrophosphate is present in an amount between 0.1 and 2 per cent by weight of the butene and sulfur dioxide.

3. A process for producing a heteropolymeric resin of a butene and sulfur dioxide, which comprises reacting a butene with sulfur dioxide while dispersed in an aqueous emulsion in the presence of a catalyst comprising a ferric ion and a polyphosphate ion.

4. In a process for producing a high molecular weight heteropolymer of sulfur dioxide and an unsaturated organic compound which reacts therewith to form such a heteropolymer, the step which comprises reacting said materials while said unsaturated organic compound is dispersed in an aqueous emulsion in the presence of a ferric polyphosphate.

5. In a process for producing a high molecular weight heteropolymer of sulfur dioxide and an unsaturated organic compound which reacts therewith to form such a heteropolymer, the step which comprises reacting said materials while dispersed in an aqueous emulsion in the presence of a composition comprising a ferric ion and a polyphosphate ion in an amount equivalent to 0.1 to 2 per cent by weight ferric polyphosphate based on the amount of said reactants.

6. The process of claim 4 in which said polyphosphate is a pyrophosphate.

7. The process of claim 4 in which said polyphosphate is a tetraphosphate.

8. The process of claim 4 in which said polyphosphate is a tripolyphosphate.

9. The process of claim 5 in which said polyphosphate is a tetraphosphate.

10. The process of claim 5 in which said polyphosphate is a tripolyphosphate.

11. An improved process for producing a heteropolymeric resin from sulfur dioxide and 1-butene which is contaminated with isobutylene as an impurity at a reaction temperature above the ceiling reaction temperature of sulfur dioxide and isobutylene, which comprises effecting said reaction while said reactants are dispersed in aqueous emulsion and in the presence of a ferric polyphosphate as a catalyst in an amount not greater than 2 per cent by weight of said reactants.

12. An improved process for producing a heteropolymeric resin from sulfur dioxide and an unsaturated organic material which reacts therewith to form such a resin and which is contaminated with an unsaturated organic impurity which retards said resin-forming reaction, which comprises effecting said reaction while said reactants are dispersed in aqueous emulsion and in the presence of a ferric polyphosphate as a catalyst in an amount not greater than 2 per cent by weight of said reactants.

13. In a process for producing a high molecular weight heteropolymer of sulfur dioxide and an unsaturated organic compound which reacts therewith to form such a heteropolymer, the step which comprises reacting said materials while dispersed in an aqueous emulsion in the presence of a composition comprising a ferric ion and a pyrophosphate ion in an amount equivalent to 0.1 to 2 per cent by weight ferric pyrophosphate based on the amount of said reactants.

14. A process for producing a heteropolymeric resin from sulfur dioxide and an unsaturated organic material which reacts therewith to form such a resin, which comprises reacting said materials while said organic material is dispersed in an aqueous emulsion in the presence of a catalyst composition comprising a ferric ion and a polyphosphate ion selected from the group consisting of pyrophosphate, tetraphosphate, tripolyphosphate, and hexametaphosphate ions.

15. The process of claim 14 in which said unsaturated organic material comprises an olefin hydrocarbon having four to eight carbon atoms per molecule and said catalyst is present in an amount not greater than 2 per cent by weight of the corresponding ferric polyphosphate based on the amount of said reactants.

WILLIE W. CROUCH.
JOHN F. HOWE.

No references cited.